US009505487B2

(12) United States Patent
Miener

(10) Patent No.: US 9,505,487 B2
(45) Date of Patent: Nov. 29, 2016

(54) CONTROL PANEL FOR USE IN CONTROLLING A LARGE AREA DISPLAY

(71) Applicant: The Boeing Company, Seal Beach, CA (US)

(72) Inventor: Steven John Miener, Florissant, MO (US)

(73) Assignee: The Boeing Company, Chicago, IL (US)

( * ) Notice: Subject to any disclaimer, the term of this patent is extended or adjusted under 35 U.S.C. 154(b) by 488 days.

(21) Appl. No.: 13/839,505

(22) Filed: Mar. 15, 2013

(65) Prior Publication Data

US 2014/0266979 A1  Sep. 18, 2014

(51) Int. Cl.
 *B64C 13/04* (2006.01)
 *B64D 31/04* (2006.01)
 *B64D 43/00* (2006.01)
 *G02B 27/01* (2006.01)

(52) U.S. Cl.
 CPC ............. *B64C 13/04* (2013.01); *B64D 31/04* (2013.01); *B64D 43/00* (2013.01); *G02B 27/01* (2013.01); *G02B 27/0149* (2013.01); *G02B 2027/0161* (2013.01)

(58) Field of Classification Search
 CPC ....... B64C 19/00; B64C 13/00; B64C 13/04; B64D 43/00; B64D 25/06; B64D 25/08; B64D 25/10; B64D 43/02; B64D 31/04; G09G 2380/12; G02B 27/01; G02B 27/0149; G02B 27/0161
 See application file for complete search history.

(56) References Cited

U.S. PATENT DOCUMENTS

| 4,372,508 | A * | 2/1983 | Frisch et al. ........... 244/122 AG |
| 6,428,198 | B1 * | 8/2002 | Saccomanno ........ G02B 6/0006 362/552 |
| 7,268,702 | B2 * | 9/2007 | Chamas ............... G01C 23/005 340/973 |
| 7,418,319 | B2 * | 8/2008 | Chen ...................... G01C 23/00 701/14 |
| 7,696,955 | B1 | 4/2010 | Krenz et al. |
| 8,694,184 | B1 * | 4/2014 | Boorman ............... G01C 23/00 340/945 |
| 2004/0217883 | A1 | 11/2004 | Judge et al. |
| 2007/0198141 | A1 * | 8/2007 | Moore ............................. 701/3 |
| 2009/0128366 | A1 * | 5/2009 | Firra ..................... B64D 43/00 340/974 |
| 2010/0090868 | A1 | 4/2010 | Hall |
| 2011/0109576 | A1 * | 5/2011 | Giannelli ....................... 345/173 |
| 2011/0176267 | A1 * | 7/2011 | Polizzotto et al. ...... 361/679.21 |
| 2011/0241901 | A1 * | 10/2011 | Firra ..................... B64D 43/00 340/974 |
| 2012/0253564 | A1 | 10/2012 | Noll et al. |
| 2013/0261851 | A1 | 10/2013 | Komer et al. |
| 2014/0142790 | A1 | 5/2014 | Andre et al. |

FOREIGN PATENT DOCUMENTS

CA  2656383 A1 *  1/2008

OTHER PUBLICATIONS

Ekman, J. "A few reasons why commercial aircraft are not equipped with ejection seats." Finnair blog, Mar. 26, 2010.*
Shender et al, "Dynamic Strength Capabilities of Small Stature Females to Eject and Support Added Head Weight", National Technical Information Service, Naval Air Warfare Center Aircraft Div., Patuxent River, MD, Accession No. ADA367876 (Aug. 3, 1999).*
Combined Search and Examination Report of Application No. GB1402625.6; Sep. 26, 2014; 5 pages.

* cited by examiner

*Primary Examiner* — Julie Anne Watko
(74) *Attorney, Agent, or Firm* — Armstrong Teasdale LLP

(57) ABSTRACT

In one aspect, an aircraft instrumentation system for a cockpit instrument panel of an aircraft is provided. The system includes a first display operable to display at least one of flight mission data or aircraft systems monitoring data, and a second display operable to control a plurality of display options of the first display. The first display and the second display are positioned outside an ejection envelope of the aircraft.

17 Claims, 3 Drawing Sheets

US 9,505,487 B2

CONTROL PANEL FOR USE IN CONTROLLING A LARGE AREA DISPLAY

BACKGROUND OF THE INVENTION

The field of the invention relates generally to airplane cockpit instrument panel configurations and, more particularly, to an up-front control panel for controlling an out-of-reach large area display.

At least some known aircraft include large displays to provide a pilot with menus, data and graphical options to facilitate increased pilot performance and aircraft safety. These large displays are commonly referred to in the aerospace industry as Multi-Functional Displays (MFDs). Some known MFDs are programmable and/or customizable and may be used by the pilot as the primary instrument or display for use in flying the aircraft. Such displays are commonly referred to as the Primary Flight Displays (PFDs). MFDs and PFDs typically include push buttons located on and around the bezel of the display that may be used to select different menus and graphical presentations of information on the displays.

In at least some known military aircraft that include an ejection seat, one large touchscreen display is installed rather than multiple smaller displays. However, generally, the taller the display, the further away the display must be positioned relative to the pilot to ensure the display remains outside of the ejection envelope. Anthropometric requirements for new aircraft have been expanded over recent years to enable smaller or shorter pilots to fly such aircraft. However, such pilots may not be able to reach the displays while in their harness, which may limit the ability to use touchscreen technology in the aircraft. Thus, there is a need for a system that enables smaller or shorter pilots with shorter limbs to control the information displayed on larger displays.

BRIEF DESCRIPTION OF THE INVENTION

In one aspect, an aircraft instrumentation system for a cockpit instrument panel of an aircraft is provided. The system includes a first display operable to display at least one of flight mission data or aircraft systems monitoring data, and a second display operable to control a plurality of display options of the first display. The first display and the second display are positioned outside an ejection envelope of the aircraft.

In another aspect, an aircraft is provided. The aircraft includes a cockpit including a cockpit instrument panel and an ejection seat including an ejection envelope, and an aircraft instrumentation system coupled to the instrument panel. The aircraft instrumentation system includes a first display operable to display at least one of flight mission data or aircraft systems monitoring data, and a second display operable to control a plurality of display options of the first display. The first display and the second display are positioned outside the ejection envelope.

In yet another aspect, a method of assembling an aircraft instrumentation system for a cockpit instrument panel of an aircraft is provided. The method includes providing a first display operable to display at least one of flight mission data or aircraft systems monitoring data, providing a second display operable to control a plurality of display options of the first display, and positioning the first display and the second display outside an ejection envelope of the aircraft.

DETAILED DESCRIPTION OF THE INVENTION

The systems and methods described herein are directed to an Up Front Control Panel (UFCP) display that uses touchscreen technology to enable a user to make selections on a larger, main display in the cockpit. Because of reduced pilot size requirements, it is possible that a shorter or smaller pilot does not have the same extended reach capability as that of a taller or larger pilot. For example, smaller pilots under 5'8" do not have the reach capability of a taller pilots over 6'2". As a result, this smaller touchscreen UFCP is positioned closer to such smaller pilots to enable the pilots to make selections on or to otherwise control a larger display, especially when the pilot is locked in a torso harness.

Figure 1:
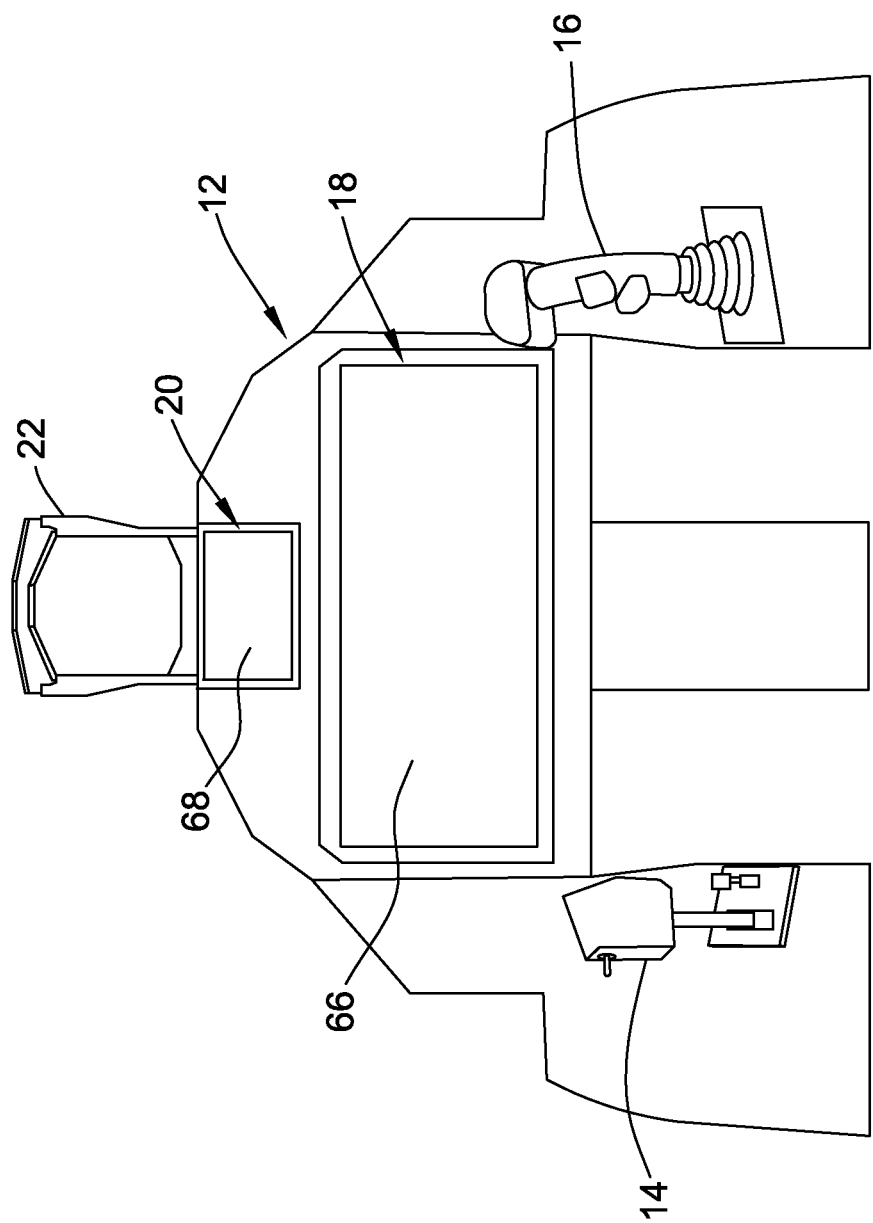
FIG. 1 is forward perspective view of an exemplary aircraft cockpit instrument panel.

FIG. 1 illustrates an exemplary forward crew station or cockpit 10 of a military aircraft (not shown) that includes an instrument panel 12, a throttle 14 to control thrust of the aircraft, and a control stick 16 to control a relative direction of travel of the aircraft. Instrument panel 12 includes a large display 18, a UFCP display 20, and a head up display (HUD) 22. The aircraft may also include a co-pilot aft crew station (not shown) that has a substantially similar construction as described above for forward crew station 10.

Figure 2:
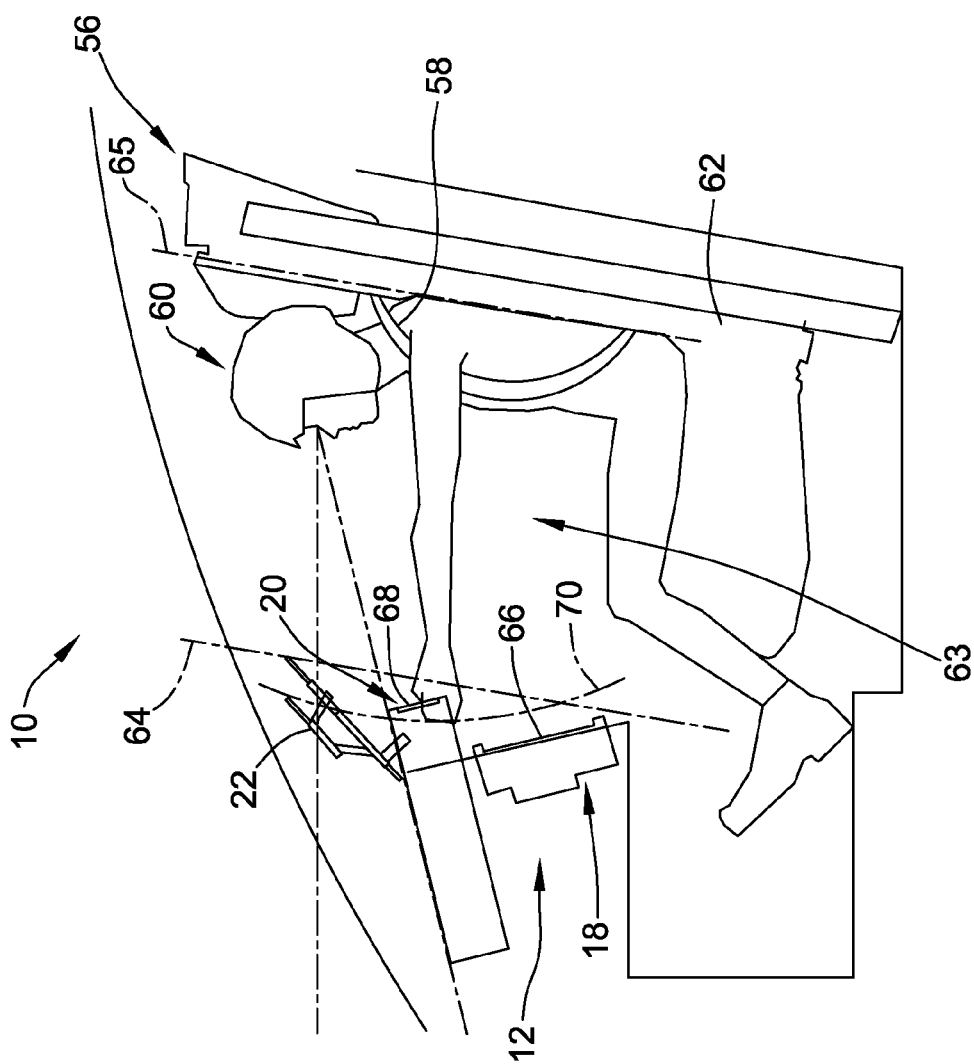
FIG. 2 is a side view of a cockpit with the instrument panel shown in FIG. 1.

FIG. 2 illustrates a side view of an aircraft including crew station 10. Station 10 includes instrument panel 12, a seat 56 having a torso harness 58, and a pilot 60. In the exemplary implementation, seat 56 is an ejection seat 62. In order for pilot 60 to safely eject from the aircraft, controls and instrumentation must be positioned outside of an ejection clearance volume or envelope 63. Ejection envelope 63 is defined at least partially between a forward ejection plane 64, an aft ejection plane 65, and side ejection planes (not shown) extending between forward ejection plane 64 and aft ejection plane 65 to the right and left of ejection seat 62 when looking to the front of the aircraft. Positioning controls and instrumentation forward of forward ejection clearance plane 64 ensures that an ejecting pilot does not contact any objects that could cause injury. In the exemplary implementation, ejection envelope 63 is approximately 30 inches by approximately 30 inches. Additionally, ejection envelope 63 may include forward ejection plane 64 having approximately a 6 inch radius between the side planes. However, the size and shape of the envelope may vary based upon the type of aircraft and the requirements of a given customer.

In the exemplary implementation, large display 18 includes a touchscreen interface 66 that displays mission related information or other data a pilot may use when piloting the aircraft. MFD or large display 18 may display flight mission or aircraft systems monitoring data according to various display options selectable by pilot 60. Such data may include flight information, subsystem information (e.g., landing gear, fuel, health monitoring, performance, etc.), maps, training information, and/or other aircraft related data.

In the exemplary implementation, large display 18 is sized approximately 8 inches by approximately 20 inches to provide pilot 60 with a large viewing area. However, ejection clearance plane 64 limits a relative location of the lower edge of large display 18 and, as such, larger objects such as large display 18 that are oriented low on instrument panel 12, must be positioned a farther distance away from seat 62 to be positioned outside of the ejection envelope 63 defined between forward ejection clearance plane 64 and aft ejection clearance plane 65. However, because large display 18 is positioned relatively lower and farther forward than typical displays, smaller pilots may be unable to reach all of, or portions of, large display 18 while secured in torso harness 58. Although the smaller pilots may be able to reach large display 18 by unlocking torso harness 58, they still must lean forward each time they need to manipulate large display 18, which takes time, increases the workload on pilot 60 especially in conditions where inertia tends to push pilot 60 back into seat 56, and can cause accidental contact with, or inadvertent movement of, sensitive systems such as control stick 16. Further, leaning forward to utilize large display 18 may cause pilot 60 to frequently remove his focus from what is external to the aircraft, which can be dangerous and may potentially compromise the aircraft and/or safety of pilot 60 or the co-pilot.

Traditionally, UFCPs have included keyboards (not shown) that enable manual inputs. However, in the exemplary implementation, instrument panel 12 includes a UFCP display 20 having a touchscreen interface 68. Display 20 is smaller than large display 18, which enables smaller display 20 to be oriented relatively higher and farther aft on instrument panel 12 such that it is within the reach 70 of a smaller pilot. As shown in FIG. 2, small display 20 is positioned forward of forward ejection clearance plane 64 such that small display 20 is located outside of ejection envelope 63. Moreover, display 20 is located within the pilot's reach 70, while large display 18 is located outside of the pilot's reach 70. In the exemplary implementation, small display 20 extends from instrument panel 12 toward pilot 60 and is located between about 4" and about 8" farther aft than large display 18. More particularly, small display 20 is located between about 5" and about 6" farther aft than large display 18. Because of space limitations within crew station 10, placement of small display 20 relative to large display 18 is critical to the described implementation. As shown in FIG. 1, small display 20 is located at the top of instrument panel 12 and oriented between large display 18 and HUD 22 to enable pilot 60 to maintain her view ahead of the aircraft while viewing small display 20 and/or utilizing touchscreen interface 68. In some implementations, crew station 10 may not include HUD 22 and may include a helmet mounted display (HMD) (not shown).

Figure 3:
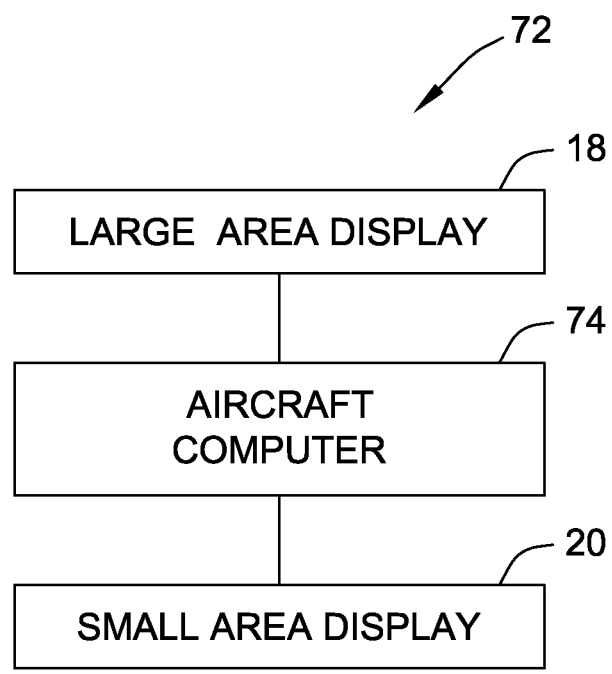
FIG. 3 is a schematic view of an exemplary interface between a large display and small display that may be used with the instrument panel shown in FIGS. 1 and 2.

FIG. 3 illustrates an exemplary display interface 72 that communicatively integrate small display 20 with large display 18 through an aircraft computer 74. For example, aircraft computer 74 may be a mission computer. Small display 20 is communicatively integrated with large display such that the pilot's interaction with touchscreen interface 68 enables control of large display 18. For example, small display 20 may display a cursor and/or menu items representative of information on large display 18. Additionally, small display may display any portion of large display 18. Moreover, any information displayed on large display 18 may be duplicated on small display 20 or otherwise represented on small display 20 for interaction therewith by pilot 60. As such, pilot 60 is able to view and/or control any information or data displayed on large display 18.

Small display 20 may also include one or more control modes. For example, small display 20 may operate in a cursor control mode such that interaction with touchscreen interface 68 moves a cursor (not shown) on large display 18. Small display 20 may also operate in a selection options mode, wherein any or all options displayed on large display 18 are replicated and displayed on small display 20. Interaction with or selection of any of the options on small display 20 will interact with or select corresponding options on large display 18. As such, small display 20 enables pilot 60 to interact with and utilize large display 18, which may be out of reach of pilot 60 or difficult for pilot 60 to reach. In addition, small display 20 may also operate in a keyboard mode, wherein traditional UFCP keys are displayed on touchscreen interface 68. Moreover, small display 20 may display other information or data for pilot 60 to interact with such as radio frequencies (e.g., UHF, or VHF transceivers), navigational waypoints, and/or brightness controls for HUD 22 and/or displays 18 and 20.

Described herein are systems and methods for enabling operation and utilization of large displays of a cockpit instrument panel by pilots unable to reach, or those that have difficulty reaching, a large display. A small display is positioned relatively closer to the pilot and includes a touchscreen. The small display is communicatively coupled with the large display such that the pilot can interact with the large display using the small display. In this way, the integrated small display enables pilots to control the large display without straining or leaning, prevents or reduces the pilot from taking his eyes off the airspace in front of the aircraft, and prevents inputs into the control stick while a pilot is reaching for the large display.

As used herein, the phrase "at least one of", when used with a list of items, means different combinations of one or more of the listed items may be used but only one item in the list of items may be needed. The item may be a particular object, thing, or category. In other words, "at least one of" means that any combination of items and any number of items may be used from the list but not all of the items in the list are required.

For example, "at least one of item A, item B, or item C" may include, without limitation, item A, item A and item B, or only item B. For example, "at least one of item A, item B, or item C" may include, without limitation, item A; both item A and item B; item A, item B, and item C; or item B and item C. In other examples, "at least one of" may be, for example, without limitation, two of item A, one of item B, and ten of item C; four of item B and seven of item C; or some other type of combination.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft instrumentation system for a cockpit instrument panel of an aircraft that includes an ejection seat positioned within a cockpit of the aircraft, said system comprising: a first display operable to display at least one of flight mission data or aircraft systems monitoring data to a pilot; and a second display operable to control a plurality of display options of said first display, wherein said first display and said second display are positioned outside an ejection envelope for the ejection seat for the pilot, wherein said second display is within reach of the pilot of the aircraft locked in a torso harness of the ejection seat, and said first display is positioned forward of said second display such that said first display is outside the reach of the pilot locked in the torso harness when the pilot is shorter than a predetermined physical height, wherein both said first display and said second display are touch screen displays, wherein a pilot shorter than said predetermined physical height enters a first set of commands and a second set of commands on the touch screen of only the second display, wherein a pilot taller than said predetermined physical height has the option of entering both said first set of commands and said second set of commands only on the touch screen of the second display while locked in the torso harness, or of entering said first set of commands on the touch screen of said first display and said second set of commands on the touch screen of said second display while locked in the torso harness.

2. The aircraft instrumentation system of claim 1, wherein said second display is positioned such that the pilot can maintain a view ahead of the aircraft while viewing said second display.

3. The aircraft instrumentation system of claim 1, wherein said system further comprises a head up display (HUD), said second display positioned below said HUD and above said first display.

4. The aircraft instrumentation system of claim 1, wherein said ejection envelope is defined at least partially by a forward ejection clearance plane, said second display positioned forward of said forward ejection clearance plane.

5. The aircraft instrumentation system of claim 1, wherein said second display is smaller than said first display.

6. The aircraft instrumentation system of claim 1, wherein the second display provides a portion of the information displayed on the first display.

7. An aircraft comprising: a cockpit including a cockpit instrument panel; an ejection seat for a pilot positioned within said cockpit, said ejection seat including an ejection envelope; and an aircraft instrumentation system coupled to said instrument panel, said aircraft instrumentation system comprising: a first display operable to display at least one of flight mission data or aircraft systems monitoring data to the pilot; and a second display operable to control a plurality of display options of said first display, wherein said first display and said second display are positioned outside the ejection envelope, wherein said second display is within reach of the pilot of the aircraft locked in a torso harness of the ejection seat, and said first display is positioned forward of said second display such that said first display is outside the reach of the first pilot locked in the torso harness when the pilot is shorter than a predetermined physical height, wherein both said first display and said second display are touch screen displays, wherein a pilot shorter than said predetermined physical height enters a first set of commands and a second set of commands on the touch screen of only the second display, wherein a pilot taller than said predetermined physical height has the option of entering both said first set of commands and said second set of commands only on the touch screen of the second display while locked in the torso harness, or of entering said first set of commands on the touch screen of the touch screen of said first display and said second set of commands on the touch screen of said second display while locked in the torso harness.

8. The aircraft of claim 7, wherein said second display is positioned such that the pilot can maintain a view ahead of said aircraft while viewing said second display.

9. The aircraft of claim 7, wherein said aircraft instrumentation system further comprises a head up display (HUD), said second display positioned below said HUD and above said first display.

10. The aircraft of claim 7, wherein said ejection envelope is at least partially defined by a forward ejection clearance plane, said second display is positioned forward of said forward ejection clearance plane.

11. The aircraft of claim 7, wherein said second display is smaller than said first display.

12. A method of assembling an aircraft instrumentation system for a cockpit instrument panel of an aircraft that includes an ejection seat positioned within a cockpit of the aircraft, said method comprising: providing a first display operable to display at least one of flight mission data or aircraft systems monitoring data to a pilot; providing a second display operable to control a plurality of display options of the first display; and positioning the first display and the second display outside an ejection envelope for the ejection seat for the pilot, wherein the second display is positioned further aft than the first display such that the second display is within reach of the pilot of the aircraft locked in a torso harness, and such that the first display is outside the reach of the pilot locked in the torso harness when the pilot is shorter than a predetermined physical height, wherein both said first display and said second display are touch screen displays, wherein a pilot shorter than said predetermined physical height enters a first set of commands and a second set of commands on the touch screen of only the second display, wherein a pilot taller than said predetermined physical height has the option of entering both said first set of commands and said second set of commands only on the touch screen of the second display while locked in the torso harness, or of entering said first set of commands on the touch screen of said first display and said second set of commands on the touch screen of said second display while locked in the torso harness.

13. The method of claim 12, further comprising positioning the second display such that the pilot can maintain a view ahead of the aircraft while viewing the second display.

14. The method of claim 12, further comprising providing a heads-up-display (HUD).

15. The method of claim 14, further comprising positioning the second display below the HUD and above the first display.

16. The method of claim 12, further comprising positioning the second display forward of a forward ejection clearance plane of the ejection envelope.

17. The method of claim 12, wherein providing a second display comprises providing a second display smaller than the first display.

* * * * *